United States Patent
Stanislawski et al.

(10) Patent No.: US 9,400,763 B2
(45) Date of Patent: Jul. 26, 2016

(54) PCI EXPRESS EXPANSION SYSTEM

(71) Applicant: RJ Intellectual Properties, LLC, San Diego, CA (US)

(72) Inventors: Mateusz Stanislawski, Valley Center, CA (US); Damian Wieczorek, Fremont, CA (US)

(73) Assignee: RJ Intellectual Properties, LLC, San Diego, CA (US)

( * ) Notice: Subject to any disclaimer, the term of this patent is extended or adjusted under 35 U.S.C. 154(b) by 349 days.

(21) Appl. No.: 14/188,020

(22) Filed: Feb. 24, 2014

(65) Prior Publication Data

US 2015/0242356 A1    Aug. 27, 2015

(51) Int. Cl.
G06F 13/40    (2006.01)
G06F 13/42    (2006.01)
G06F 3/00    (2006.01)

(52) U.S. Cl.
CPC ........ *G06F 13/4086* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 6,728,546 B1 * | 4/2004 | Peterson | ............. | H04M 1/2473 455/462 |
| 2012/0144230 A1 * | 6/2012 | Buckland | ............ | G06F 13/4022 714/4.5 |

* cited by examiner

*Primary Examiner* — Scott Sun
(74) *Attorney, Agent, or Firm* — Nields, Lemack & Frame, LLC

(57) ABSTRACT

Expansion boxes have been traditionally used to provide additional expansion slots to those that are provided in the computer system. As the speed of expansion busses has increased, it has become increasingly difficult to provide an expansion box and interconnect to that expansion box that is reliable and low cost. For example, PCI Express Gen 3 provides a very high speed interconnect, allowing data rates up to 32 GBytes/sec in some configurations. Various techniques to maintain the signal integrity of this expansion bus, even over distances greater than 1 meter, are disclosed. Some of these techniques include proper selection of cable impedance, proper selection of PC board materials, and specific PC layout guidelines.

15 Claims, 1 Drawing Sheet

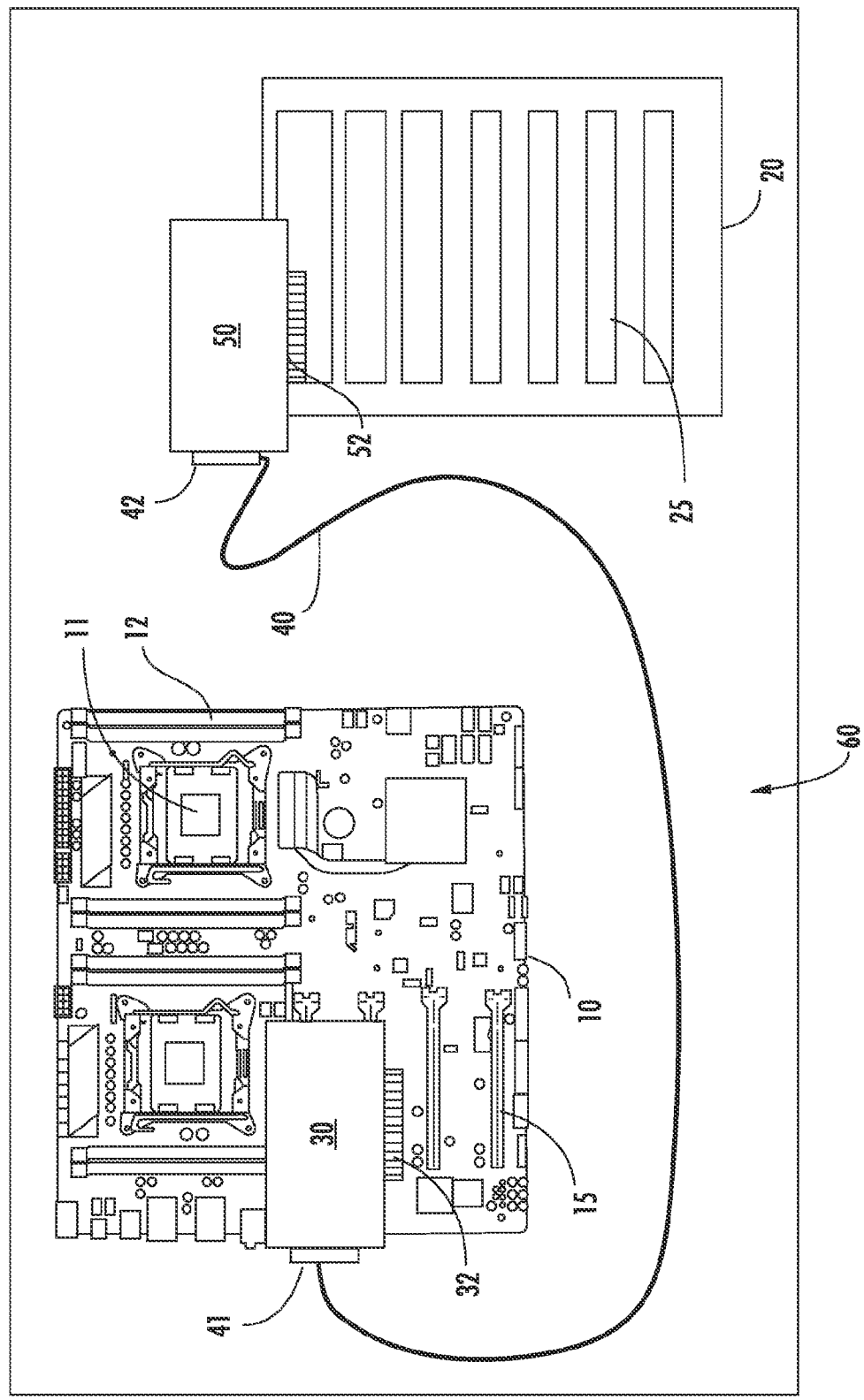

PCI EXPRESS EXPANSION SYSTEM

BACKGROUND

Computer systems typically include a processing unit, local memory, and several other functions. Some systems include the ability to incorporate additional functions through the use of an expansion bus. An expansion bus typically included one or more expansion connectors, each of which contains voltage, ground, data and control signals. An external circuit board, having the mating connector, can be inserted into the expansion bus connector. Since the expansion connector supplies all of the required power, data and control signals, the inserted circuit board is able to operate as if it were incorporated directly into the computer system. Each expansion connector on the computer system represents a slot into which an external circuit board may be inserted to augment the functionality of the computer system. Thus, these expansion connectors are sometimes referred to as "slots" or "expansion slots"

Various protocols are commonly used for these expansion busses. For example, PCI, an acronym for Peripheral Component Interconnect, has been used for many years to provide the ability to add additional functions to computer systems. The PCI protocol defines both the physical configuration of the expansion connector and the electrical specification of all of the signals used on that connector. In more recent years the PCI SIG has released an upgraded version of PCI called PCI Express, where the signaling protocol changed from a parallel to a serial implementation, as well as allowed for large bandwidth increases. PCI Express has released subsequent specification versions, also referred to as Gen 1, Gen 2 and more recently, Gen 3, respectively.

While computer systems may include one or more expansion slots, in some embodiments, there is a need for more expansion slots. In some scenarios, expansion boxes have been used. An expansion box is an accessory to the computer system, which includes a plurality of expansion slots. The Expansion box connects to the computer system via an expansion slot in the computer system. In some cases, the connection between the computer system and the expansion box is simply an expansion cable. In other words, a first circuit board, which contains only the mating connector and the expansion cable, is inserted into one of the expansion slots in the computer system. The far end of the expansion cable connects to a second circuit board, which is then plugged into the backplane of the expansion box.

While this mechanism has been used to provide additional expansion slots, as the speed of expansion busses has increased, the ability to make a low cost expansion box has decreased. For example, in some embodiments, the first circuit board described above, also includes active circuitry. For example, PCI Express switches chips, PCI Express repeater chips, or PCI Express retimer chips which buffer the PCI signals from the computer system to improve their signal integrity, have been used. While effective, this approach increases the cost of the expansion box, and may impact the overall speed of the computer system.

Therefore, it would be beneficial if that was a mechanism to provide an expansion box, especially for high speed expansion busses, which does not require the use of active circuitry.

SUMMARY

Expansion boxes have been traditionally used to provide additional expansion slots to those that are provided in the computer system. As the speed of expansion busses has increased, it has become increasingly difficult to provide an expansion box and interconnect to that expansion box that is reliable and low cost. For example, PCI Express Gen 3 provides a very high speed interconnect, allowing data rates up to 32 GBytes/sec in some configurations. Various techniques to maintain the signal integrity of this expansion bus, even over distances greater than 1 meter, are disclosed. Some of these techniques include proper selection of cable impedance, proper selection of PC board materials, and specific PC layout guidelines.

BRIEF DESCRIPTION OF THE FIGURES

For a better understanding of the present disclosure, reference is made to the accompanying drawings, which are incorporated herein by reference and in which:

FIG. 1 shows a representative schematic of a computer system and an expansion box according to one embodiment.

DETAILED DESCRIPTION

As described above, expansion boxes have been used to create additional expansion slots in a computer system. FIG. 1 shows a representative schematic of a computer system and an expansion box. As described above, the computer system 10 may include one or more processing units 11, also known as central processing units (CPUs). Also included may be memory devices. In other embodiments, memory connectors 12 are employed. External memory circuit boards, which typically include a plurality of memory devices, may be inserted in the memory connectors 12 to provide the memory for the computer system 10. Other functions, such as video, audio and timers (not shown), may also be included in the computer system 10. The computer system 10 may have one or more expansion slots 15. As described above, the expansion slots 15 allow the insertion of circuit boards, which conform to the protocol of that expansion bus.

In some embodiments, PCI Express is used as the expansion bus. Since its development, the PCI Express standard has evolved, increasing speed and functionality with each subsequent generation. Currently, PCI Express has defined a third generation standard known as Gen 3. This standard includes increased data bandwidth, supporting up to 32 GBytes/sec operating in full duplex mode, when used in a x16 configuration (i.e. 16 differential data signals in parallel as an interconnect to form a single link). Differential signaling has been adopted in PCI Express as compared to the single-ended net implementation of PCI in order to greatly improve the signal quality and external noise immunity. Differential signaling uses two single-ended nets to transmit a signal over one wire and its voltage complement over the second wire. The receiving end monitors the difference between the two voltages, hence allowing for a smaller voltage swing resulting in lower power consumption, as well as high common mode noise rejection capabilities. Common mode noise comprises any external influences on the voltages transmitted through both of the signal wires within a differential pair.

PCI Gen 3, as it is known, supports 8 Gbps for each data signal. When 16 data signals are used, 128 Gbps can be achieved in each direction. Various encoding schemes are supported by the PCI Express specification, including 128/130 bit encoding for Gen 3, and 8/10 bit encoding used in the earlier generations. However, the encoding schemes used are not limited by this disclosure and any desired encoding scheme may be used with a corresponding protocol.

Returning to FIG. 1, an expansion box 20 is also shown. The expansion box 20 includes a plurality of expansion slots 25, which may be the same configuration as the expansion slots 15 in the computer system, or may be a different physical format. In other words, the physical configuration of the expansion slots 25 is not important. Rather, it is only important that the same underlying electrical interface and specification is used. Furthermore, the number of expansion slots 25 included in the expansion box 20 is not limited by this disclosure. The expansion box 20 may include a cooling mechanism, such as a fan, to cool the electronic circuits that are installed in the expansion box 20. In some embodiments, the expansion box 20 may include a power supply (not shown) to power the electronic circuits that are installed in the expansion box 20.

FIG. 1 shows an interconnect 60 that may be used to connect the computer system 10 to the expansion box 20. Then interconnect 60 includes a first circuit board 30, a cable 40 and a second circuit board 50.

As stated, the interconnect 60 comprises a first circuit board 30, which is adapted to be inserted into one of the expansion slots 15 in the computer system. Thus, the first circuit board 30 includes a connector 32 suitable to be inserted into an expansion slot 15 of the computer system 10. In some embodiments, this connector 32 of the first circuit board 30 comprises a plurality of fingers disposed along one edge of the first circuit board 30. This plurality of fingers is typically metallic, such as gold or gold plated, and are arranged to align with corresponding contact points in the expansion slot 15. The first circuit board 30 also includes a cable connector, which connects to a cable 40.

The cable 40 may be any length, such as between 0.5 meters and 2.0 meters. In some embodiments, the cable 40 may be longer than 1.0 meters. In other embodiments, the cable 40 may be longer than 2.0 meters. In other embodiments, the cable 40 may be as short as 10 inches. The cable itself may be implemented using copper wires for the signal transmission or utilize fiber optic modules and fiber wires an interconnection mechanism. Fiber optic modules and wires convert the electrical signals that may be transmitted through copper into optical wavelengths that are then transmitted through a medium, such as, for example, a fiber wire. The optical receiver then converts the received signal from the optical signal into an electrical signal that once again may be transmitted through a medium, such as copper. The lengths of the cable in this implementation may vary greatly depending on the specific implementation needs.

The cable 40 also includes cable connectors 41, 42 at its opposite ends. The cable connector 41 attaches to the cable connector disposed on the first circuit board 30. The cable connector 42 attaches to the cable connector disposed on the second circuit board 50. In some embodiments, the cable 40 may have an impedance of 85 ohms, rather than the 100 ohms, typically used for prior art PCI cables. The cable 40 may also be differential twinaxial cabling for improved data and signal integrity. In some embodiments, the interconnect 60 is used to connect a x16 interface. This may be done by carrying all of the data signals on a single physical cable 40. In another embodiment, the cable 40 comprises a plurality of physical cables, where each carries a subset of the total number of data signals. For example, in one embodiment, the cable 40 comprises two physical cables, each carrying 8 data signals and some control or sideband signals.

On the opposite end of the cable 40 is a second circuit board 50, which is adapted to be inserted into an expansion slot 25 in the expansion box 20. As described above with respect to the first circuit board 30, second circuit board 50 includes a connector 52 suitable to be inserted into an expansion slot 25 of the expansion box 20. In some embodiments, this connector 52 of the second circuit board 50 comprises a plurality of fingers disposed along one edge of the second circuit board 50. This plurality of fingers is typically metallic, such as gold or gold plated, and are arranged to align with corresponding contact points in the expansion slot 25. The second circuit board 50 also includes a cable connector, which connects to the cable connector 42 of the cable 40.

It may be preferable that the error rate of this interconnect 60 be as low as possible. In some embodiments, an error rate of one error per every $10^{12}$ bits is considered to be acceptable. In other embodiments, error rates of one error per every $10^{11}$ bits, or less, may be acceptable.

Thus, in one embodiment, a system, comprising a computer system 10, having a central processing unit, and at least one expansion slot is disclosed. This computer system 10 is connected to an expansion box 20, which comprises a plurality of expansion slots. The computer system 10 and the expansion box 20 are connected using an interconnect 60. This interconnect 60 is designed so that, over a cable distance of 1.0 meters, the error rate across the interconnect 60 is less than or equal to one error per $10^{12}$ bits transferred. In other embodiments, this error rate is achieved at cable distances of 2.0 meters or further.

Various techniques may be used to achieve the desired error rate. First, as described above, the cable 40 may have an impedance of 85 ohms. Testing has shown that, despite the ubiquitous use of 100 ohm cable, improved error rates may be achieved using a cable having an impedance of less than 100 ohms. In one embodiment, an 85 ohm cable is used. Further, as stated above, the cable 40 may actually be more than one physical cable. Each of these physical cables may carry a subset of the total number of data signals. For example, in one embodiment, the cable 40 comprises two physical cables, each carrying eight data signals and additional sideband signals. In addition, the cable 40 may be differential twinaxial cable. The interconnect 60 may also be implemented in such a fashion to meet the small form factor specification requirements, also known as SFF, as well as half length circuit board dimensions altogether in a single example implementation.

Another aspect of the interconnect 60 is the design of the first circuit board 30 and the second circuit board 50. A number of different techniques may be employed to improve the signal integrity of the interconnect 60. For example, in one embodiment, the circuit boards 30, 50 each comprise a number of interconnects disposed in the circuit board. These interconnects are commonly known as traces. In the first circuit board 30, these traces are used to connect the cable connector and the connector 32. In the second circuit board 50, these traces are used to connect the cable connector and the connector 52. These traces are each part of a circuit board. Circuit boards typically comprise a number of layers, where some of these layers are used to carry traces, which are conductive. Other layers are used to insulate these conductive layers from one another. In traditional circuit boards, any changes in the direction of a trace may be achieved through the use of a 90° turn or two 45° turns. However, in one embodiment of the present disclosure, signal integrity is increased by using curved traces, rather than sharp angular turns. Thus, instead of a 90° turn, or two consecutive 45° turns, the first circuit board 30 may utilize a curved trace to change direction. The curved trace may also implement a certain geometry aspect ratio with regards to how sharp the curvature can be. These curved traces improve the characteristics of the signal transmitted therethrough, especially in the third and fifth harmonics of the differentially transmitted signals. In addition to curved traces, the layout of the traces may be done so as to minimize high speed signal losses also known as insertion loss. Additionally, the layout and trace geometry may be selected to minimize differential impedance discontinuities seen by the signal.

Another aspect may be the exclusive use of surface mount connections. In many prior art configurations, connections to some components, such as connectors and the like, is made using through-hole contacts. This implies that a hole is drilled through all of the layers of the circuit board, and a conductive pin is inserted into the hole and either pressed in or soldered in place. However, signal integrity may be improved in some embodiments by the elimination of through-hole contacts. In lieu of through-hole contacts, surface mount contacts are used. Surface mount contacts are formed by soldering a pin (such as from a connector) directly to the surface of the circuit board. Thus, in one embodiment, the cable connector of the first circuit board and the second circuit board is affixed to the respective circuit board using surface mount contacts.

In another embodiment, the material used to manufacture the first circuit board 30 and the second circuit board 50 is modified. Typically, a material or family of materials known as FR4 is used as the laminate for circuit boards. In one embodiment, a "spread glass" material is employed. Spread glass is a term for a fiber glass weave style group of glass, where the crisscrossing strands of glass are interlaced in a fashion that minimizes holes between the weaves. Many different types of spread glass material, such as 1035, 1067, 3313 (which are different styles of fiberglass weave for FR4 material) are commercially available and may be used.

In another embodiment, the circuit board design may include back drilling of the differential high speed vias. Back drilling is a technique to remove part of the conductive material in a via by drilling through a portion of that via with a slightly larger drill bit, thereby removing a portion of the conductive material in the via. By doing so, the stub length of each via is reduced. In some cases, this reduction may be substantial. This translates to fewer signal reflections on the differential pair, which results in better signal quality for that differential pair.

Finally, many of the PCI signals used are differential pairs. The first circuit board 30 uses paired traces to transmit a differential pair from the connector to the cable connector. These paired traces may be designed within the industry standard of +/−10% tolerance of their nominal differential impedance, while holding all geometry to a current industry standard of +/−1 mil tolerance.

In summary, the first or second circuit board 30, 50 may use one or more of the techniques described above to improve the signal integrity of the signals transmitted on the respective circuit boards.

The above describes a first circuit board 30 which does not include any active electronic components that buffer, retime or otherwise modify the signals received from the expansion bus. In other words, the first circuit board 30 comprises only passive components, which include connectors, traces, capacitors, inductors and resistors. The first circuit board is devoid of any active electronics that modify signals received from the expansion bus. Similarly, the second circuit board 50 may likewise comprise only passive components that are in communication with the signals associated with the expansion bus.

While the above describes the second circuit board 50 as comprising only passive elements, having only connections, other embodiments are also possible. For example, in one embodiment, the first circuit board 30 is as described above. However, the second circuit board 50 may comprise an electronic component, such as a PCI Express switch or a signal retimer device. This device is used to buffer the received PCI Express signals before they are forward to the other expansion slots 25 in the expansion box 20.

In yet another embodiment, the expansion box 20 has a PCI Express switch disposed therein. The second circuit board 50 is installed in an expansion slot 25 that is in communication with the PCI Express switch. The signals received by the second circuit board 50 are forwarded to the PCI Express switch, where they are buffered before being forwarded to the other expansion slots 25 in the expansion box 20.

While the above disclosure describes the interconnect 60 for use with PCI Gen 3, the disclosure is not limited to this embodiment. For example, these techniques may be applied to any high speed expansion bus protocol, including, but not limited to Ethernet, Infiniband, and HyperTransport. In some embodiments, these techniques may be used with any protocol that utilizes differential paired signaling. In other embodiments, these techniques may be used with any protocol operating at a data rate of 8 Gbps or more.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
    a computer system utilizing an expansion bus, wherein signals in said expansion bus operate at a data rate of at least 8 Gb/s, and having at least one expansion slot;
    an expansion box having a plurality of second expansion slots; and
    an interconnection between said computer system and said expansion box, wherein said interconnection comprises:
        a first circuit board inserted into said expansion slot, said first circuit board devoid of any active electronic components that modify the signals received from said expansion slot;
        a second circuit board inserted into one of said second expansion slots; and
        a cable having a first connector in communication with the first circuit board and a second connector in communication with the second circuit board, wherein said cable has a length of at least 0.5 meters;
    wherein an error rate of said interconnect is less than 1 error per $10^{12}$ bits transferred.

2. The system of claim 1, wherein said cable has an impedance of 85 ohms.

3. The system of claim 1, wherein said first circuit board is made using a spread glass material.

4. The system of claim 1, wherein said first circuit board comprising traces that connect from said expansion slot to said first connector, and said traces are curved traces.

5. The system of claim 1, wherein said first connector is attached to said first circuit board using surface mounting.

6. The system of claim 1, wherein said first circuit board comprises vias to connect traces disposed on different layers of said circuit board, and said vias are backdrilled.

7. The system of claim 1, wherein said expansion bus uses PCI Express Gen 3 signalling.

8. The system of claim 1, wherein said cable is at least 2.0 meters long.

9. The system of claim 1, wherein said second circuit board is devoid of any active electronics.

10. An interconnection between a PCI Express expansion slot in a computer system and a second PCI Express expansion slot in an expansion box, comprising:
   a first circuit board inserted into said expansion slot, said first circuit board devoid of any active electronic components that modify the signals received from said expansion slot;
   a second circuit board inserted into one of said second expansion slots; and
   a cable having a first connector in communication with the first circuit board and a second connector in communication with the second circuit board, wherein said cable has a length of at least 0.5 meters;
   wherein an error rate of said interconnect is less than 1 error per $10^{12}$ bits transferred and data is transmitted on said interconnection at a data rate of at least 8 Gbps.

11. The interconnection of claim 10, wherein said cable has an impedance of 85 ohms.

12. The system of claim 10, wherein said first circuit board is made using a spread glass material.

13. The system of claim 10, wherein said first circuit board comprising traces that connect from said expansion slot to said first connector, and said traces are curved traces.

14. The system of claim 10, wherein said first connector is attached to said first circuit board using surface mounting.

15. The system of claim 10, wherein said first circuit board comprises vias to connect traces disposed on different layers of said circuit board, and said vias are backdrilled.

* * * * *